(12) United States Patent
Mason

(10) Patent No.: US 7,449,228 B2
(45) Date of Patent: Nov. 11, 2008

(54) FLOOR MAT

(75) Inventor: Shirley Mason, P.O. Box 1630, Germantown, MD (US) 20875

(73) Assignee: Shirley Mason, Martinsburg, WV (US)

( * ) Notice: Subject to any disclaimer, the term of this patent is extended or adjusted under 35 U.S.C. 154(b) by 181 days.

(21) Appl. No.: 11/187,877

(22) Filed: Jul. 25, 2005

(65) Prior Publication Data

US 2006/0019057 A1   Jan. 26, 2006

Related U.S. Application Data

(60) Provisional application No. 60/590,915, filed on Jul. 26, 2004, provisional application No. 60/675,492, filed on Apr. 28, 2005.

(51) Int. Cl.
*B32B 33/00* (2006.01)
*B32B 3/02* (2006.01)
*B32B 3/06* (2006.01)
*A47L 23/22* (2006.01)

(52) U.S. Cl. ........................ 428/88; 428/85; 428/101; 15/215; 15/216; 15/217

(58) Field of Classification Search .................. 428/88, 428/85, 101; 15/215, 216, 217
See application file for complete search history.

(56) References Cited

U.S. PATENT DOCUMENTS

| D90,510 | S |   | 8/1933 | Schwartz |            |
|---------|---|---|--------|----------|------------|
| 2,338,022 | A | * | 12/1943 | Blair et al. | 425/388 |
| 2,410,412 | A | * | 11/1946 | Hurford | 74/564 |
| 2,680,385 | A |   | 1/1954 | Estin |   |
| 2,802,375 | A | * | 8/1957 | Van Der Gaast | 74/560 |
| 2,894,339 | A | * | 7/1959 | Shapiro | 36/72 B |
| 3,095,659 | A | * | 7/1963 | McClellan | 36/72 B |
| 3,114,272 | A | * | 12/1963 | Sawyer | 74/564 |
| D200,152 | S |   | 1/1965 | Steinberg |   |

(Continued)

FOREIGN PATENT DOCUMENTS

EP   379630 A1 * 8/1990

(Continued)

OTHER PUBLICATIONS

Automotive Accessories Annual Book, Catalogs 1995, Model No. BF-10 on p. 150, published on Oct. 31, 1994.

*Primary Examiner*—Cheryl Juska
(74) *Attorney, Agent, or Firm*—Jean C. Edwards, Esq.; Akerman Senterfitt

(57) ABSTRACT

The present invention relates to a floor mat which can prevent scuffs on the heels of a user's footwear. The floor mat includes at least a first layer of material; a scuff-resistant portion provided on the first layer; and a glide mechanism which moves the scuff-resistant portion on the first layer when a force is applied to the scuff-resistant portion. The glide mechanism may include an elastic portion connected to the scuff-resistant portion and to the first layer, a backing layer connected to the elastic portion; and a base portion connected to the backing layer. The base portion may be disposed on a second layer, the second layer which is disposed beneath the first layer. Further, the first layer may have an opening such that the base portion which is connected to the second layer, is accessible through the first layer. The scuff-resistant portion is made of plush felt.

20 Claims, 3 Drawing Sheets

U.S. PATENT DOCUMENTS

| | | | | |
|---|---|---|---|---|
| 3,239,953 | A * | 3/1966 | Norton | 36/72 B |
| 3,983,641 | A * | 10/1976 | Wright | 36/72 B |
| 4,262,048 | A | 4/1981 | Mitchell | |
| 4,406,492 | A | 9/1983 | Cackowski | |
| 4,660,301 | A * | 4/1987 | Atwood | 36/72 B |
| 4,662,082 | A * | 5/1987 | Shabazz | 36/72 B |
| 4,721,641 | A | 1/1988 | Bailey | |
| 4,810,024 | A | 3/1989 | Heller | |
| 4,829,627 | A * | 5/1989 | Altus et al. | 16/4 |
| 4,835,030 | A * | 5/1989 | Squier et al. | 428/88 |
| 4,910,061 | A | 3/1990 | St. Julian | |
| 4,991,900 | A * | 2/1991 | White | 296/75 |
| 5,215,348 | A | 6/1993 | Wen-Hwang | |
| 5,236,241 | A | 8/1993 | Courrege | |
| 5,312,151 | A * | 5/1994 | Krahn | 296/75 |
| 5,482,759 | A * | 1/1996 | Primeau | 428/167 |
| D394,835 | S | 6/1998 | Crute-Williams et al. | |
| 5,919,540 | A | 7/1999 | Bailey | |
| 5,925,304 | A | 7/1999 | Kudoh | |
| 5,938,872 | A * | 8/1999 | Chang et al. | 156/67 |
| D421,950 | S | 3/2000 | Lu | |
| 6,219,876 | B1 * | 4/2001 | Blum | 15/215 |
| 6,224,962 | B1 * | 5/2001 | Young, III | 428/76 |
| D455,384 | S | 4/2002 | Kraines | |
| 6,677,027 | B1 * | 1/2004 | Lu | 428/138 |
| 2006/0019057 | A1 * | 1/2006 | Mason | 428/88 |

FOREIGN PATENT DOCUMENTS

| | | | |
|---|---|---|---|
| IT | EM 210612-0009 | | 10/2004 |
| JP | 57084820 | A * | 5/1982 |
| JP | 01115749 | A * | 5/1989 |
| JP | D1183728 | | 9/2003 |
| JP | D1202620 | | 4/2004 |
| JP | D1241945 | | 6/2005 |
| JP | D1244626 | | 7/2005 |
| JP | D1247696 | | 8/2005 |
| JP | D1248147 | | 8/2005 |

* cited by examiner

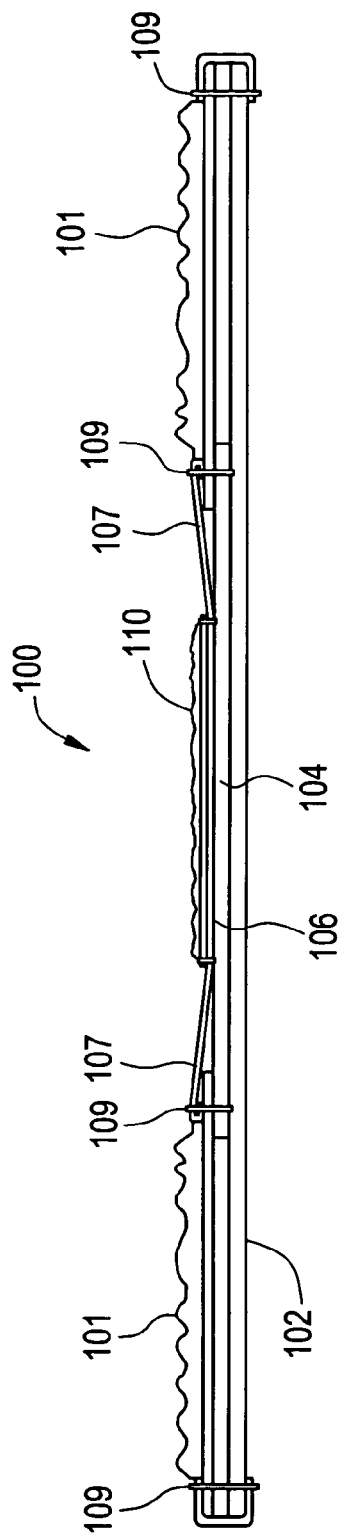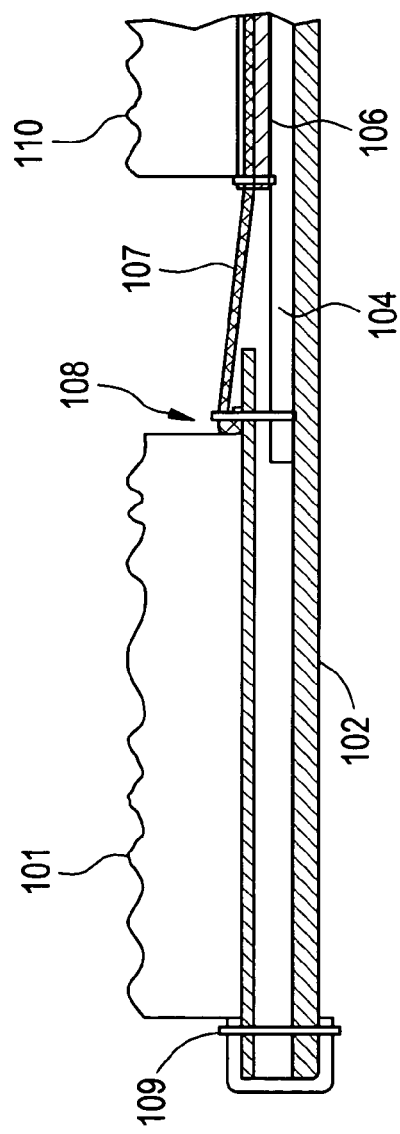

FLOOR MAT

CROSS-REFERENCE TO RELATED APPLICATIONS

The present invention claims priority from U.S. Provisional Patent Application No. 60/590,915, dated Jul. 26, 2004, and from U.S. Provisional Patent Application No. 60/675,492, dated Apr. 28, 2005, the entire contents of which are incorporated by reference herein.

BACKGROUND OF THE INVENTION

1. Field of the Invention

The present invention relates to floor mats, and in particular, to floor mats used in motor vehicles.

2. Description of the Related Art

Conventional floor mats scuff the heels of the shoes of users. In particular, floor mats in motor vehicles scuff the heels of the shoes of users—particularly women's shoes which are made from more delicate fabrics (i.e., suede, silk, etc.).

Although there are inexpensive driving shoes sold to obviate this concern, these do not solve the problem at hand, since the driving shoes also become damaged and worn.

In other attempts at a solution, various heel or shoe guards for floor mats have been designed, which attempt to provide either a softer surface for the footwear, or an undulating surface or grid-like surface to remove dirt etc. However, these inserts and materials do not solve the problem, and footwear continues to incur scuff marks.

Accordingly, a floor mat, particularly an automobile floor mat, which is capable of preventing scuffs on the heels of a user's footwear, in order to preserve the life of the footwear, and that of the floor mat itself, would be advantageous.

SUMMARY OF THE INVENTION

The present invention relates to a floor mat which can prevent scuffs on the heels of a user's footwear.

In one embodiment of the present invention, the floor mat includes at least a first layer of material; a scuff-resistant portion provided on the first layer; and a glide mechanism which moves the scuff-resistant portion on the first layer when a force is applied to the scuff-resistant portion.

In one embodiment consistent with the present invention, the glide mechanism may include an elastic portion connected to the scuff-resistant portion and to the first layer, a backing layer connected to the elastic portion; and a base portion connected to the backing layer. The base portion may be disposed on a second layer, the second layer which is disposed beneath the first layer. Further, the first layer may have an opening such that the base portion which is connected to the second layer, is accessible through the first layer.

In another embodiment consistent with the present invention, the scuff-resistant portion includes a pillow. The pillow may extend a width of a surface of the floor mat.

In yet another embodiment consistent with the present invention, the scuff-resistant portion is made of plush felt.

In yet another embodiment consistent with the present invention, the base portion is made of rubber, and the backing layer is made of acetate. Further, the elastic portion is made of a spandex-type material. The elastic portion is connected to the first layer using a connection mechanism from the group consisting of stitching, hook and eye fastening, and adhesive.

In yet another embodiment consistent with the present invention, there is a border around the second layer.

In yet another embodiment consistent with the present invention, the first layer is made of carpeting material.

In yet another embodiment consistent with the present invention, the second layer and/or the reverse side of the first layer includes a rubber portion, and the reverse side of the first layer includes another scuff resistant portion disposed on the rubber portion.

In yet another embodiment consistent with the present invention, the floor mat includes at least a first layer; and glide means for moving a portion of the first layer when a force is applied to the first layer. The glide means includes a scuff-resistant portion; an elastic portion connected to the scuff-resistant portion and to the first layer; a backing layer connected to the elastic portion; and a base portion connected to the backing layer.

Finally, in yet another embodiment consistent with the present invention, the floor mat includes a lower layer of material; an upper layer disposed on the lower layer; a base portion disposed on the lower layer and accessed through an opening in the upper layer; an intermediate portion disposed on the base portion; and a scuff-resistant portion provided on the intermediate portion. The backing layer is disposed between the intermediate portion and the scuff-resistant portion.

There has thus been outlined, some features consistent with the present invention in order that the detailed description thereof that follows may be better understood, and in order that the present contribution to the art may be better appreciated. There are, of course, additional features consistent with the present invention that will be described below and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

FIG. 2A is a side view of the floor mat of FIG. 1 according to one embodiment consistent with the present invention.

FIG. 2B is a detailed side view of the floor mat of FIG. 1 according to one embodiment consistent with the present invention.

DESCRIPTION OF THE INVENTION

The present invention relates to a floor mat, particularly a motor vehicle floor mat, which can protect footwear from scuffs, and which can withstand all weather conditions with no slippage of the floor mat itself, or if used in a motor vehicle, with no slippage by a user's footwear on the floor mat.

Figure 1:
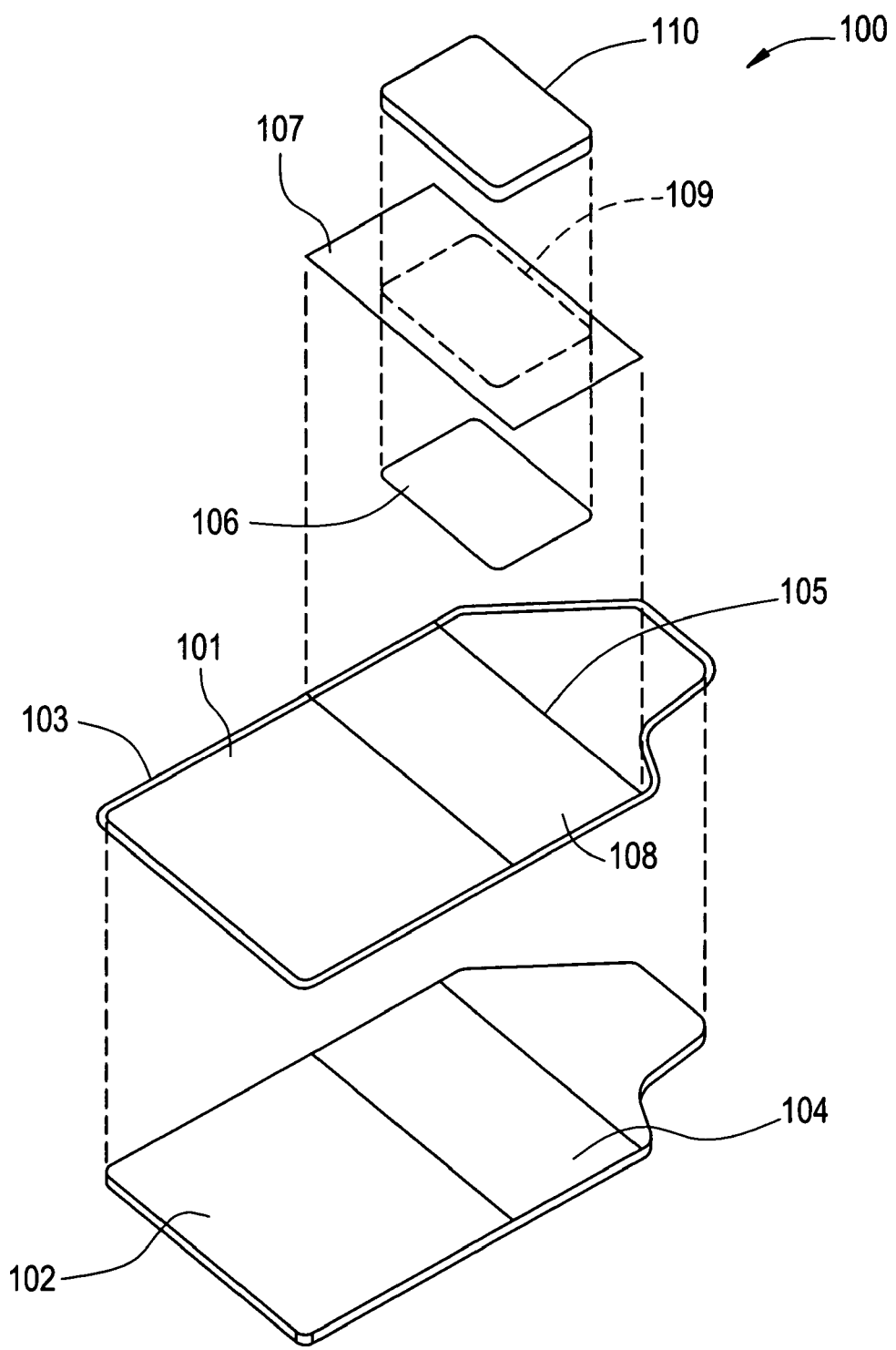
FIG. 1 is an exploded perspective view of a floor mat according to one embodiment consistent with the present invention.

In one embodiment consistent with the present invention, the floor mat 100 (see FIG. 1) is roughly rectangular in shape with a roughly trapezoid portion at the top portion of the mat 100. However, one of ordinary skill would know that the floor mat 100 could be of any shape and size that would be suitable for the type of motor vehicle or other environment in which the floor mat 100 is being used.

When used in a motor vehicle, the floor mat 100 is designed to rest upon, match in contour, and protect a similarly-shaped portion of the floor well of a motor vehicle. Accordingly, although the floor mat 100 is rigid in appearance, it retains enough flexibility to be inserted into the floor well of the motor vehicle, and to match its contour.

In one embodiment consistent with the present invention, the floor mat 100 includes at least two layers—an upper layer 101 of carpeting material with binding, and a lower layer 102 of rubber, for example, for slip-resistance. The upper layer 101 can be attached to the lower layer 102 by any suitable adhering mechanism, such as stitching, hook and loop fastening, or adhesive, for example.

The upper layer 101 may be of an attractive appearance, in any type and grade of carpet, although the carpet is usually a tufted, cut pile carpet of synthetic fibers in a woven backing material, such as a nylon or spun polypropylene, for example.

The carpeting material of the upper layer 101 of the floor mat 100 of the of present invention should be durable, washable, and moisture absorbent. The dyes used in the carpeting material should be permanent dyes of high quality to prevent bleeding and discoloration of footwear on the automobile flooring.

In one embodiment consistent with the present invention, the upper layer 101 may have a border 103, which provides a finish to the edges of the floor mat 100, and can provide additional rigidity to the floor mat 100. The border 103 can also enhance the floor mat's 100 appearance by its color and shape. The border 103 may utilize vinyl binding or yarn serging, and may have rolled edges, as desired. Further, the border 103 may be made of any suitable material, such as a synthetic or natural fiber.

In addition, the border 103 may have a functional use and may be weighted for additional slip resistance. In this embodiment, weights of metal or synthetic can be provided within the binding of the border 103 to provide proper placement and the additional slip resistance.

In one embodiment consistent with the present invention, a base portion 104 (see FIGS. 1, 2A and 2B) is provided in the lower layer 102 of the floor mat 100. The base portion 104 is made of a synthetic felt or a similar material, which is attached, fastened, or adhered to the upper side of the rubber material of the lower layer 102 of the floor mat 100.

The upper layer 101 contains a similarly-shaped cut out window 105 which, when the two layers 101, 102 are attached, fastened, or adhered together, allows the base portion 104 to be accessed.

Although the base portion 104 is horizontal and roughly rectangular in shape, one of ordinary skill in the art would know that this shape, as well as that of the window 105, could be modified as desired as long as access is provided to the material of the base portion 104.

In one other embodiment consistent with the present invention, an intermediate portion 108 is disposed on the base portion 104, a backing layer 106 is provided on the base portion 104, and an elastic portion 107 is attached or adhered to the backing layer 106.

Finally, in one embodiment consistent with the present invention, the scuff-resistant portion 110 is attached (i.e., stitched), hook and eye fastened, or adhered to the backing material 106, at stitch line 109. However, one of ordinary skill in the art would know that any suitable means for adhering the backing layer 106, elastic portion 107, and scuff-resistant portion 110, together, can be used.

In one embodiment consistent with the present invention, the elastic portion is made of a highly flexible and durable, low friction material, such as elastic nylon, a spandex material, spandex-type blend, or the like). The elastic portion 107 is attached, fastened, or stitched to the upper layer 101 at stitch line 109 for example.

The flexible material of the elastic portion 107 allows the scuff resistant portion 110 to move with the user's footwear while the remainder of the floor mat 110 stays in place (i.e., to "glide"). To facilitate movement, the scuff resistant portion 110 is backed by the backing layer 106, which is made of a thin, friction-free-type (i.e., "slick") material (i.e., an acetate or the like).

Likewise, the base portion 104 provides a low coefficient of friction, allowing the scuff resistant portion 110 to slide freely when being moved by a user's footwear, and being constrained by only the elastic material (i.e., elastic portion 107) that surrounds it, and any residual friction between the two friction-free (i.e., slick) surfaces.

In one embodiment consistent with the present invention, due to the cut-out window portion 105 in the upper layer 101, the scuff resistant portion 110, although provided on the elastic portion 107, is approximately the same height as that of the upper layer 101 when the floor mat 101 is assembled (see FIG. 2).

In one embodiment consistent with the present invention, plush felt is the preferable material for the scuff-resistant portion 110 as providing virtually no scuffs on footwear (see the Example below). However, any other material which is suitable to provide the above characteristics, could be used.

Figure 3:
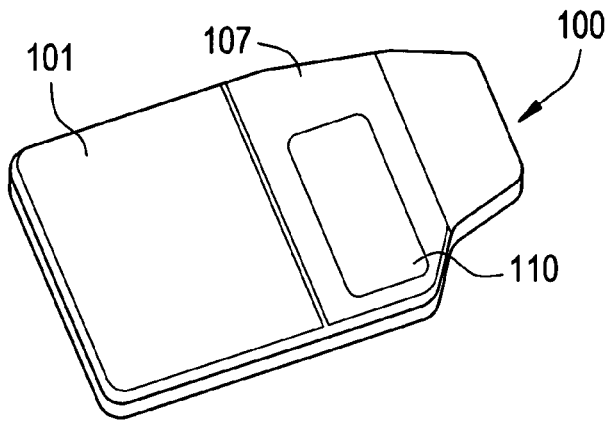
FIG. 3 is a perspective view of the floor mat of FIG. 1 in one embodiment consistent with the present invention.

In use, the floor mat 100 (see FIG. 3) of the present invention is placed in the desired position (i.e., on the floor well of a motor vehicle), and the scuff-resistant portion 110 would be provided in a position on the floor mat 100 below the right foot of the user. Accordingly, the heel portion of the user's footwear would touch the scuff-resistant portion 110 of the floor mat 100. However, with the scuff-resistant portion 110, this friction between the heel of the user and the floor mat 100 which is brought about while the user is driving and moving their foot, would not result in scuffing of the user's footwear.

In particular, as described in the embodiment above, the low friction material used for the backing layer 106 and for the elastic portion 107, as well as the base portion 104 ("glide means"), allows the scuff-resistant portion 110 which touches the heel of the user's footwear, to move, or "glide" with the footwear, thereby significantly reducing the friction between the shoe and the mat 100.

Figure 4:
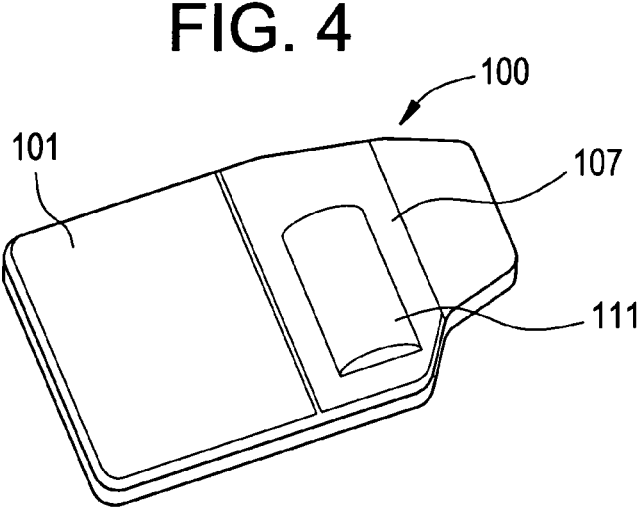
FIG. 4 is a perspective view of another embodiment of the floor mat consistent with the present invention.

In another embodiment consistent with the present invention, the floor mat 100 (see FIG. 4) has a scuff-resistant portion 111 which includes a "pillow" of beads or gel covered by the scuff-resistant material (i.e., plush felt or the like). The pillow 111 is raised above the plane of the carpeting (i.e., upper layer 102) of the floor mat 100, in order for the user to rest their heel against the pillow 111. Thus, the user's shoe would not be scuffed during driving of the motor vehicle, for example.

In addition, the "pillow" 111 could be provided with or without the "glide" feature. In other words, the materials used for the elastic portion 107 and the backing layer 106, and perhaps the base portion 104, could be materials which have increased frictional properties, and thus, would not move with the movement of the user's foot.

Figure 5:
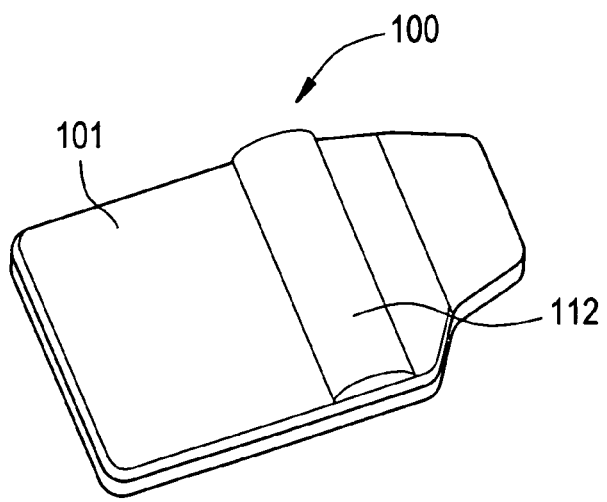
FIG. 5 is a perspective view of still another embodiment of the floor mat consistent with the present invention.

In yet another embodiment consistent with the present invention, the floor mat 100 (see FIG. 5) the "pillow" 112 extends across the horizontal width of the floor mat 100, which provides even greater flexibility for the user and greater protection for both shoes. As with the pillow 111, this embodiment can be provided with our without the glide feature.

EXAMPLE

In one example, scuff tests were performed on three kinds of shoe materials: hi-quality leather, regular leather, and vinyl; with respect to the scuff resistant material of the present invention (i.e., plush felt), and another commercially available material marketed as "scuff-resistant".

A test was designed and constructed to simulate relative motion of a vehicle driver's right leg and a floor mat while driving. The set-up was built as a development of the ASTM's "pin-on-disk" wear test. The "pin" had a spherical surface of 2.5 inches in diameter, representing the heel of a shoe. The shoe materials covered the "pin" and were secured with double-coated tape and a hose clamp. The floor mat materials were attached to the "disk" (actually a flat surface) with double coated tape.

The relative motion between the driver's shoe heel and the floor mat that occurs during the switching leg's position from the rest position to the driving position, was simulated. It was assumed that the driver moved his/her leg 10 times per day. Therefore, each test used a 1000 reciprocal cycles representing about 100 days or about 3 months of driving.

Since the linear motion of the heel is minimal, a 1 inch movement was used. To simulate the driver pushing his/her leg against the floor mat with a variable force, 3.8 lbs of dead weight was applied on the pin during the test.

Since at the end of the 1000 cycle test, scuffs were not apparent on the shoe materials, the scuff-resistant material of the present invention was tested for another 1000 cycles.

The following results were obtained.

TABLE 1

| | Hi-quality leather | Regular leather | Vinyl |
|---|---|---|---|
| Commercially available material (at 1000 cycles) | Moderate amount of scuffing | Small amount of scuffing | Minimal scuffing |
| Scuff-resistant material of the present invention (at 2000 cycles) | No scuffs | No scuffs | No scuffs |

It can be seen from the results, that the material used for the scuff-resistant portion 110 (i.e., plush felt), as embodied in the present invention, far exceeded that of the results of the commercially available material, even at twice the number of cycles tested.

Thus, the scuff-resistant material 110 of the present invention, when used with the above described construction of the present invention, prevents abrasion of footwear, reduces maintenance of footwear, and provides comfort for the user, extending the lifecycle of the shoes as well as the floor mat itself.

Although the layers of materials provided in the floor mat 100 have been described as having particular shapes, sizes, materials, and thicknesses, one of ordinary skill in the art would know that any suitable shape, size, thickness, and material can be used for the various layers or portions. For example, the scuff-resistant portion 110 could be of a larger size, including that of constituting the entire floor mat 100. Further, the carpeted layer 101 could be replaced entirely by rubber for weather reasons, and the position of the scuff-resistant portion 110 on the floor mat 100 can be varied as desired. Still further, the carpeting material could be replaced by any type of material that would be useful for removing dirt from footwear, and could be of varying heights and thicknesses, including undulating or grid patterns. Finally, as stated above, the elastic portion 107 could be replaced by a material which does not allow movement of the scuff-resistant portion 110.

Further, the floor mat 100 may be reversible, and in addition to the embodiment with a scuff-resistant portion 110 on a carpeted layer 101, the opposite side of the floor mat 100 may be made completely of rubber for bad weather protection, or of rubber with a scuff resistant portion therein, for footwear protection.

Further, although the floor mat 100 has been described of layers and portions which are adhered, fastened, or stitched together, in another embodiment consistent with the present invention, the floor mat 100 may be a modular system with removable portions and layers which fit together. For example, in a modular system, the scuff resistant portion 110 can have a hook and eye fastened backing that can be replaced with a rubber insert for bad weather.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A floor mat comprising:
   at least a first layer of material;
   a scuff-resistant portion provided on said first layer; and
   a glide mechanism which moves said scuff-resistant portion on said first layer when a force is applied to said scuff-resistant portion.

2. The floor mat according to claim 1, wherein said glide mechanism comprises:
   an elastic portion connected to said scuff-resistant portion and to said first layer.

3. The floor mat according to claim 2, wherein said glide mechanism further comprises:
   a backing layer connected to said elastic portion; and
   a base portion connected to said backing layer.

4. The floor mat according to claim 3, wherein said base portion is disposed on a second layer, said second layer which is disposed beneath said first layer.

5. The floor mat according to claim 4, wherein said first layer has an opening such that said base portion which is connected to said second layer, is accessible through said first layer.

6. The floor mat according to claim 1, wherein said scuff-resistant portion comprises a pillow.

7. The floor mat according to claim 1, wherein said scuff-resistant portion is comprised of plush felt.

8. The floor mat according to claim 6, wherein said pillow extends a width of a surface of said floor mat.

9. The floor mat according to claim 3, wherein said base portion is comprised of rubber.

10. The floor mat according to claim 3, wherein the backing layer is comprised of acetate.

11. The floor mat according to claim 2, wherein said elastic portion is comprised of a spandex material.

12. The floor mat according to claim 2, wherein said elastic portion is connected to said first layer using a connection mechanism from the group consisting of stitching, hook and eye fastening, and adhesive.

13. The floor mat according to claim 4, further comprising: a border around said second layer.

14. The floor mat according to claim 1, wherein said first layer is comprised of carpeting material.

15. The floor mat according to claim 4, wherein at least one of said second layer and a reverse side of said first layer comprises:
a rubber portion.

16. The floor mat according to claim 15, wherein said reverse side of said first layer comprises another scuff resistant portion disposed on said rubber portion.

17. A floor mat comprising:
at least a first layer; and
glide means for moving a portion of said first layer when a force is applied to said layer.

18. The floor mat according to claim 17, wherein said glide means comprises:
a scuff-resistant portion;
an elastic portion connected to said scuff-resistant portion and to said first layer;
a backing layer connected to said elastic portion; and
a base portion connected to said backing layer.

19. A floor mat comprising:
a lower layer of material;
an upper layer disposed on said lower layer;
a base portion disposed on said lower layer and accessed through an opening in said upper layer;
an elastic portion disposed on said lower layer;
an intermediate portion disposed on said base portion;
a scuff-resistant portion provided on said intermediate portion;
said scuff-resistant portion being housed within an opening in said elastic portion.

20. The floor mat of claim according to claim 19, further comprising:
a backing layer disposed between said intermediate portion and said scuff-resistant portion.

* * * * *